United States Patent
Zheng et al.

(10) Patent No.: US 10,356,194 B2
(45) Date of Patent: Jul. 16, 2019

(54) METHOD, SYSTEM AND CLIENT FOR UPLOADING IMAGE, NETWORK SERVER AND COMPUTER STORAGE MEDIUM

(71) Applicant: TENCENT TECHNOLOGY (SHENZHEN) COMPANY LIMITED, Shenzhen, Guangdong (CN)

(72) Inventors: Zhihao Zheng, Shenzhen (CN); Zhu Liang, Shenzhen (CN); Huixing Wang, Shenzhen (CN); Jia Ma, Shenzhen (CN); Huiming Gan, Shenzhen (CN); Hao Wu, Shenzhen (CN); Wendong Zhang, Shenzhen (CN); Yancheng Yu, Shenzhen (CN); Yiting Zhou, Shenzhen (CN); Jiancheng Lin, Shenzhen (CN); Wenbin Liu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 780 days.

(21) Appl. No.: 14/555,817

(22) Filed: Nov. 28, 2014

(65) Prior Publication Data

US 2015/0089028 A1    Mar. 26, 2015

Related U.S. Application Data

(63) Continuation of application No. PCT/CN2013/076495, filed on May 30, 2013.

(30) Foreign Application Priority Data

Jun. 1, 2012 (CN) .......................... 2012 1 0178929

(51) Int. Cl.
| | | |
|---|---|---|
| *G06F 15/16* | (2006.01) | |
| *H04L 29/08* | (2006.01) | |
| *H04W 28/00* | (2009.01) | |

(52) U.S. Cl.
CPC .............. *H04L 67/26* (2013.01); *H04L 67/06* (2013.01); *H04L 67/10* (2013.01); *H04W 28/00* (2013.01); *H04N 2201/0029* (2013.01)

(58) Field of Classification Search
CPC ................................ H04L 67/26; H04L 67/06
See application file for complete search history.

(56) References Cited

U.S. PATENT DOCUMENTS

| | | | | | |
|---|---|---|---|---|---|
| 5,371,607 | A | * | 12/1994 | Hannina | ................. H04L 12/28 358/400 |
| 2008/0263103 | A1 | * | 10/2008 | McGregor | .......... G06F 21/6218 |

(Continued)

FOREIGN PATENT DOCUMENTS

| CN | 1851692 A | 10/2006 |
|---|---|---|
| CN | 1909551 A | 2/2007 |

(Continued)

OTHER PUBLICATIONS

Notification of the First Office Action of Chinese application No. 201210178929.4 , dated Aug. 31, 2015.

(Continued)

*Primary Examiner* — Liang Che A Wang
*Assistant Examiner* — Joel Mesa
(74) *Attorney, Agent, or Firm* — Morgan, Lewis & Bockius LLP

(57) ABSTRACT

The present disclosure relates to the technical field of wireless network communications, and provides a method, system and client for uploading an image, a network server and a computer storage medium. The method includes: a client determines an image to be uploaded, generates a (Continued)

unique image identifier corresponding to the image to be uploaded, and transmits an image detection request to a network server; the network server detects whether there is an image having the same image identifier in the network server according to the image identifier included in the image detection request, and returns a detection result to the client; when the detection result is that there is not an image having the same image identifier in the network server, the client uploads the image to be uploaded in the form of multi-part uploading to the network server; and after the image to be uploaded is uploaded successfully, the network server records the image identifier, and returns an upload success response to the client. The present disclosure avoids a repeated uploading of a same image, so that the upload rate is improved, a great deal of network traffic bandwidth is saved, and user experiences are improved.

10 Claims, 3 Drawing Sheets

(56) References Cited

U.S. PATENT DOCUMENTS

| | | | | |
|---|---|---|---|---|
| 2009/0319570 A1* | 12/2009 | Subramanian | .......... | G06F 16/50 |
| 2012/0054177 A1* | 3/2012 | Wang | .................. | G06K 9/4609 |
| | | | | 707/723 |
| 2014/0071232 A1* | 3/2014 | Tsukagoshi | ........ | H04N 21/2353 |
| | | | | 348/43 |
| 2014/0093122 A1* | 4/2014 | Rabinowitz | ........... | G06T 1/0021 |
| | | | | 382/100 |

FOREIGN PATENT DOCUMENTS

| | | |
|---|---|---|
| CN | 1972250 A | 5/2007 |
| CN | 101340396 A | 1/2009 |
| CN | 101465872 A | 6/2009 |
| CN | 101546321 A | 9/2009 |
| CN | 101771552 A | 7/2010 |
| CN | 102360293 A | 2/2012 |

OTHER PUBLICATIONS

International Search Report in international application No. PCT/CN2013/076495 , dated Sep. 5, 2013.

English Translation of the Written Opinion of the International Search Authority in international application No. PCT/CN2013/076495 , dated Sep. 5, 2013.

* cited by examiner

METHOD, SYSTEM AND CLIENT FOR UPLOADING IMAGE, NETWORK SERVER AND COMPUTER STORAGE MEDIUM

CROSS-REFERENCE TO RELATED PATENT APPLICATIONS

This is a continuation application of International Patent Application No.: PCT/CN2013/076495, filed on May 30, 2013, which claims priority to Chinese Patent Application No.: 201210178929.4, filed on Jun. 1, 2012, the disclosure of which is incorporated by reference herein in its entirety.

TECHNICAL FIELD

The present disclosure relates to the field of wireless network communications, and in particular to a method, system and client for uploading an image, a network server and a computer storage medium.

BACKGROUND

Cloud synchronization refers to data synchronization between a cloud device and a server on a cloud platform, or data sharing between different devices of an individual on a cloud platform. The cloud synchronization provides a user with convenience and safety for mobile data backup, and can collect data stored in different devices by a user, so as to provide a platform which can be browsed and managed as a whole. Cloud synchronization of an image in a mobile device is to perform, on a server, a cloud storage backup on the image stored in the mobile device through a cloud synchronization solution. At present, in solutions provided by the prior art, there are below disadvantages: (1) resuming from breakpoint is not supported, i.e., if uploading of an image is interrupted due to disconnection of a network or exhaustion of a power supply of the device, the uploading of the image is desired to restart from scratch when synchronization is resumed, and it is not supported to continue the uploading from the position at which the file is interrupted previously; (2) detection of repeated synchronization of a same image is not supported, i.e., when a user has multiple devices and some of the devices have same photos, or another user has the same photos, the existing cloud synchronization solution will perform repeated uploading, resulting in a waste of resources.

SUMMARY

In view of the above, embodiments of the present disclosure are intended to provide a method, system and client for uploading an image, a network server and a computer storage medium, so as to solve problems due to that the existing technology for uploading an image does not implement an anti-repetition detection function for a same image, such as a slow uploading rate, a waste of a great deal of network traffic bandwidths and less effective user experiences.

Embodiments of the present disclosure are implemented as follows. A method for uploading an image, including: a client determines an image to be uploaded, generates a unique image identifier corresponding to the image to be uploaded, and transmits an image detection request to a network server;

the network server detects whether there is an image having the same image identifier in the network server according to the image identifier included in the image detection request, and returns a detection result to the client;

when the detection result is that there is not an image having the same image identifier in the network server, the client uploads the image to be uploaded in the form of multi-part uploading to the network server; and after the image to be uploaded is uploaded successfully, the network server records the image identifier, and returns an upload success response to the client.

Another objective of the embodiments of the present disclosure is to provide a system for uploading an image, and the system includes a client and a network server, wherein the client is configured to: determine an image to be uploaded, generate a unique image identifier corresponding to the image to be uploaded, and transmit an image detection request to the network server;

the network server is configured to: detect whether there is an image having the same image identifier in the network server according to the image identifier included in the image detection request, return a detection result to the client, record the image identifier after the image to be uploaded is uploaded successfully, and return an upload success response to the client; and the client is further configured to: when the received detection result returned by the network server is that there is not an image having the same image identifier in the network server, upload the image to be uploaded in the form of multi-part uploading to the network server.

Yet another objective of the embodiments of the present disclosure is to provide a client for uploading an image, and the client includes:

an image identifier generation unit, configured to determine an image to be uploaded and generate a unique image identifier corresponding to the image to be uploaded;

a detection request transmitting unit, configured to transmit an image detection request to a network server so that the network server detects whether there is an image having the same image identifier in the network server according to the image identifier included in the image detection request; and an uploading unit, configured to upload the image to be uploaded in the form of multi-part uploading to the network server when the received detection result returned by the network server is that there is not an image having the same image identifier in the network server.

Still another embodiment of the present disclosure provides a network server, and the network server includes:

a detection unit, configured to: detect whether there is an image having a same image identifier in the network server according to an image identifier included in an image detection request transmitted by a client, and return a detection result to the client;

a multi-part reception unit, configured to receive an image to be uploaded transmitted by the client and uploaded in the form of multi-part uploading;

an identifier recording unit, configured to record the image identifier after the image to be uploaded is uploaded successfully; and an upload response transmitting unit, configured to return an image upload success response to the client.

A further embodiment of the present disclosure provides a computer storage medium, in which a computer-executable instruction is stored, wherein the computer-executable instruction is configured to implement the aforementioned method for uploading an image.

In the embodiments of the present disclosure, a client determines an image to be uploaded, generates a unique image identifier corresponding to the image to be uploaded, and transmits an image detection request to a network server; the network server detects whether there is an image having the same image identifier in the network server according to the image identifier included in the image detection request, and returns a detection result to the client; when the detection result is that there is not an image having the same image identifier in the network server, the client uploads the image to be uploaded in the form of multi-part uploading to the network server; and after the image to be uploaded is uploaded successfully, the network server records the image identifier, and returns an upload success response to the client. Accordingly, the embodiments of the present disclosure solve problems due to that the existing technology for uploading an image does not implement an anti-repetition detection function for a same image, such as a slow uploading rate, a waste of a great deal of network traffic bandwidths and less effective user experiences, thus improving greatly the upload rate and the upload success rate, saving a great deal of network traffic bandwidths, and also improving user experiences.

DETAILED DESCRIPTION

To illustrate technical solutions and advantages of the present disclosure, the present disclosure will be further elaborated below in combination with the accompanying drawings and embodiments. It should be appreciated that the specific embodiments are only used to interpret the present disclosure instead of limiting the present disclosure.

In embodiments of the present disclosure, before a client uploads an image to be uploaded to a network server, the network server detects whether the image to be uploaded has already been uploaded, and thus avoiding the traffic loss and the waste of resources resulted from a repeated upload; and uploading of the image by the client in the form of multi-part uploading can record at any time the upload status of the image at the client and the network server, so that it is only desired to upload other un-uploaded parts from an interrupted position during a subsequent re-uploading process, thereby implementing the resuming from breakpoint and also improving the success rate of the uploading. After the image has been successfully uploaded, the image identifier of the successfully-uploaded image is recorded at the network server and the client, thus implementing an anti-repetition detection function for a same image, and solving problems, such as a slow uploading rate, a waste of a great deal of network traffic bandwidths and less effective user experiences.

The specific implementation of the present disclosure will be elaborated below in combination with specific embodiments.

Embodiment 1

Figure 1:
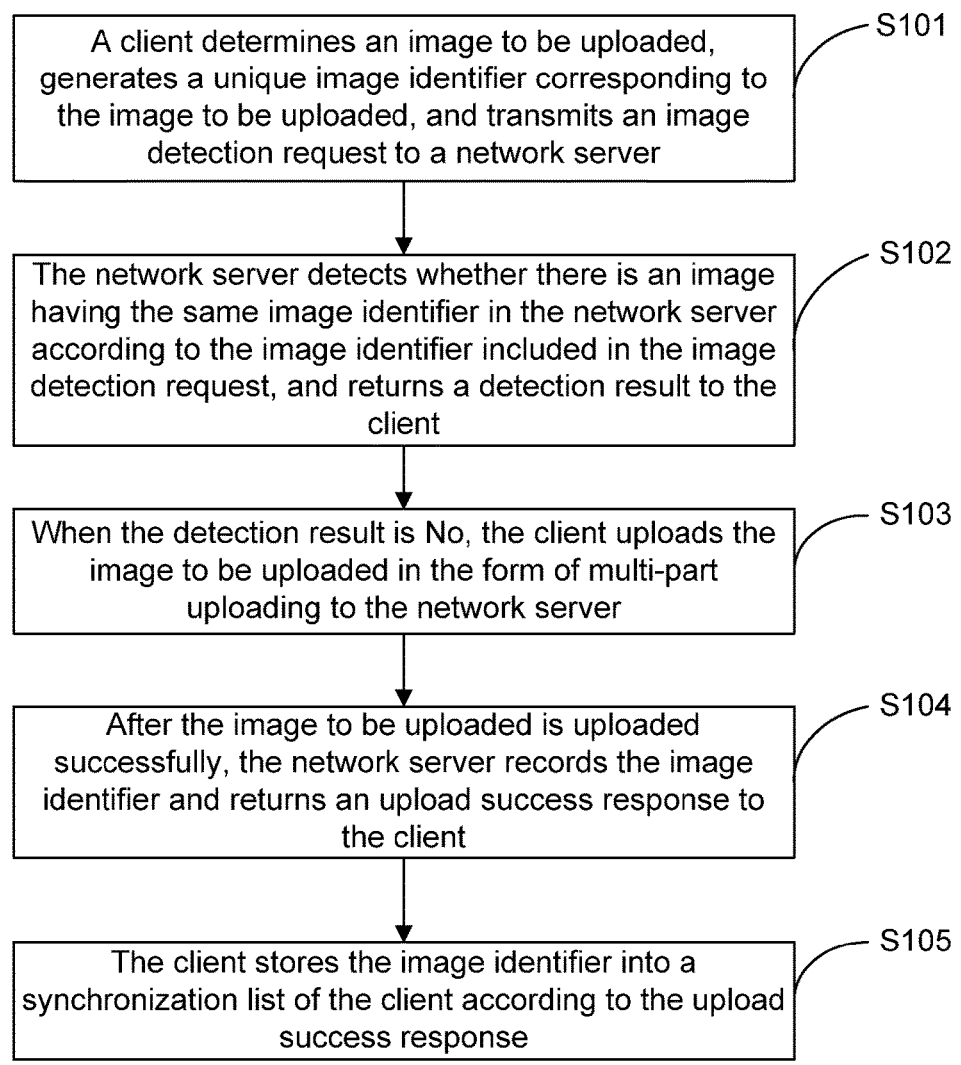
FIG. 1 illustrates a flow chart of a method for uploading an image according to a first embodiment of the present disclosure.

FIG. 1 shows a flow of a method for uploading an image according to a first embodiment of the present disclosure, and the flow is elaborated as follows.

In step S101, a client determines an image to be uploaded, generates a unique image identifier corresponding to the image to be uploaded, and transmits an image detection request to a network server.

Wherein the image identifier refers to an ID used to uniquely identify the image and generated according to feature information of the image, such as the shape, colour and texture of an image.

After implementing the generating by the client a unique image identifier corresponding to the image to be uploaded and before implementing the transmitting an image detection request to a network server in step S101, the method for uploading an image further includes:

It is determined whether there is already an image identifier corresponding to the image to be uploaded in the synchronization list of the client, when there is already an image identifier corresponding to the image to be uploaded in the synchronization list of the client, the image upload operation is exited; when there is not an image identifier corresponding to the image to be uploaded in the synchronization list of the client, the image detection request is transmitted to the network server.

During the specific implementation, a user may operate a client terminal to manually upload an image, or the client terminal may automatically upload a new image when the new image is generated. After the user selects an image desired to be uploaded, the client generates a unique image identifier for identifying the image according to file attribute information, such as the content, establishment time and path of the image. For example, the unique image identifier for identifying the image may consist of the image path and the image name, or consist of feature information alone (such as the texture, colour and shape of the image), or consist of a digital identifier defined by the client, and there are no specific limits to the image identifier as long as it can uniquely identify the image.

The synchronization list of the client is established in advance for storing a successfully-uploaded image and the image identifier corresponding to the successfully-uploaded image; if an selected image has already been successfully uploaded to the network server, the successfully-uploaded image and its corresponding image identifier are stored in the synchronization list of the client, thus a preliminary screening is desired to be performed before the selected image is uploaded, so as to determine whether there is already an image identifier corresponding to the image in the synchronization list, when there is already an image identifier corresponding to the image in the synchronization list, it means that the image already exists in the network server, thus the operation for uploading the image is exited; when there is not an image identifier corresponding to the image in the synchronization list, it means that the image is not yet uploaded, thus subsequent steps are implemented. Of course, feature matching may be performed on the selected image and each image in the synchronization list according to a method for matching feature information of images, so as to determine whether the selected image has already been uploaded by determining whether there is already a matched image in the synchronization list. However, due to the great calculation amount of acquiring feature information of an image, it is preferable that the embodiment of the present disclosure determine by using an image identifier.

Specifically, when the user enters a photo album, a photo list will be displayed, considering that there are many photos in the photo album, then the number of photos displayed in each page may be set, for example 50 photos are displayed per page; after the user determines an photo desired to be uploaded, the ID of the photo desired to be uploaded is calculated according to the content or feature information of the photo desired to be uploaded, a query synchronization or uploading information is transmitted to a background synchronization list, then it can be preliminarily determined whether the client records information that the photo has already been uploaded, if it records, the photo will not be uploaded any more; otherwise, a detection request is transmitted to the network server. Moreover, in the embodiment of the present disclosure, when the user turns the page, synchronization information of a photo may be displayed through asynchronous loading, and a prompt of the synchronization information can be displayed to the user so as to remind the user, for example, a default un-synchronized photo can be selected and a successfully-uploaded image cannot be selected any more. Thus, by determining firstly at the client whether there are already successfully-uploaded images in images to be uploaded, the embodiment of the present disclosure can avoid a waste of resources resulted from a repeated upload of an image, and thus can reduce the workload for a user to upload images.

It should be noted that during a practical operation of uploading an image through a client, it is possible that a user may delete a client software for cloud synchronization due to certain reasons or a crash occurs in the client software, which results in that buffer information of the present technical solution is deleted, for example, a synchronization list or a multi-part storage list is deleted, then the client cannot accurately performs the preliminary screening on the image to be uploaded, and cases such as screening errors or inaccurate screening may occur if only the aforementioned preliminary screening is performed. Accordingly, in order to avoid those cases, in a preferable embodiment of the present disclosure, an image detection request needs subsequently to be transmitted to the network server.

In step S102, the network server detects whether there is an image having the same image identifier in the network server according to the image identifier included in the image detection request, and returns a detection result to the client.

During the specific implementation, the network server receives the image detection request transmitted from the client, and according to the image identifier included in the image detection request (the image identifier is namely ID information corresponding uniquely to the image to be uploaded), the network server determines whether the ID of the image to be uploaded is the same as one of IDs of all images back-upped thereof or successfully-uploaded images, when the ID of the image to be uploaded is the same as one of IDs of all images back-upped thereof or successfully-uploaded images, it means that there is a repeated ID, there is already a corresponding image backup in the network server, and it is not necessary to upload the image to be uploaded once again; the ID of the image to be uploaded is not the same as one of IDs of all images back-upped thereof or successfully-uploaded images, it means that there is not a repeated ID, and the network server returns the detection result to the client.

In step S103, when the detection result is that the ID of the image to be uploaded is not the same as one of IDs of all images back-upped thereof or successfully-uploaded images, the client uploads the image to be uploaded in the form of multi-part uploading to the network server.

Specifically, when the received detection result returned by the network server is that there is not an image having the same image identifier in the network server, it means that the image is not back-upped in the network server, then a multi-part uploading strategy is implemented on the image, i.e., an image is divided into multiple parts, each part is successively uploaded, and every time a part is successfully uploaded, the successfully-uploaded part is recorded respectively in the client and the network server; once all the parts of the image are successfully uploaded, the network server may recombine all the parts, thus a complete backup of the image is obtained. It should be noted that the multi-part uploading strategy is on condition that an image is divided in one way so as to obtain multiple parts and the multiple parts can be recombined in another way so as to generate the image, and there are no specific limits to the method for dividing an image.

In addition, in step S103, when the uploading, by the client, the image to be uploaded in the form of multi-part uploading to the network server is implemented, the method for uploading an image further includes:

When it is detected that the uploading process of the image to be uploaded is interrupted, the client and the network server establish a corresponding relation between the image identifier of the image to be uploaded and a successfully-uploaded part of the image both in a preset multi-part storage list of the client and an interruption list of the network server.

Specifically, the network server detects that the image to be uploaded by the user is unique, and the client is desired to upload the image to the network server. However, since the network environment where the client is located is complicated, in the case of a 2G/3G network, a common upload rate is relatively slow, and due to the instability of the wireless network, the cloud synchronization process of the image may be interrupted at any time due to reasons such as a problem regarding a network connection, the exhaustion of a power supply of a mobile device, or a user-initiated interruption. If due to these interruptions of the upload process, it is desired in each time that the client re-uploads the content of the image from beginning to end, the cloud synchronization process will be rather slow, and network traffic bandwidths of a user may also be wasted. Therefore, the embodiment of the present disclosure proposes to upload the image to be uploaded in the form of multi-part uploading, i.e., the image is divided into several parts, and the combination of content of all the parts is equal to the whole content of the original image; when it is detected that the upload process is interrupted, a corresponding relation between the image identifier of the image to be uploaded and a successfully-uploaded part of the image may be established in time both in a multi-part storage list of the client and an interruption list of the network server, wherein interruption record condition of the upload-interrupted image is recorded in the multi-part storage list, for example, the image identifier corresponding to the upload-interrupted image and information of the successfully-uploaded part are recorded; similarly, interruption record condition of the upload-interrupted image is recorded in the interruption list, for example, the image identifier corresponding to the upload-interrupted image and information of the successfully-uploaded part are recorded.

Specifically, the multi-part uploading strategy according to the embodiment of the present disclosure may also be dynamically adjusted based on the type of a network environment, for example, a network environment detection module is arranged at a client to determine the type of a current network environment, and for a network environment where the rate is slow, the number of bytes occupying by each part may be adjusted to be small in advance, in this way, the success rate of uploading a part can be ensured to the most extent. While for a network environment where the rate is fast, such as a wireless WiFi, the number of bytes occupying by each part may be adjusted to be great, so as to reduce interaction times between a client and a network server. The number of bytes occupying by a part to be uploaded may not only be adjusted before multi-part uploading, but also be adjusted during the multi-part uploading according to information such as the type of the network environment at that time, thus enhancing the flexibility of the multi-part uploading.

The step S103 specifically includes:

The client divides the image to be uploaded into multiple parts and transmits a multi-part upload request to the network server;

The network server determines whether there is the image identifier of the image in the interruption list of the network server according to the multi-part upload request, and returns a determination result to the client;

When the determination result is that there is not the image identifier of the image in the interruption list of the network server, the client uploads successively the multiple parts to the network server;

When the determination result is that there is the image identifier of the image in the interruption list of the network server, the client determines and uploads un-uploaded parts of the multiple parts to the network server according to a part corresponding to the image identifier in the interruption list; and After the network server detects that all the multiple parts of the image to be uploaded already exist, the multiple parts are combined into the image to be uploaded, and the image is stored.

The step S103 may further include:

When the determination result is Yes and when there is the image identifier of the image to be uploaded in the multi-part storage list of the client, the client determines and uploads un-uploaded parts of the multiple parts to the network server according to a part corresponding to the image identifier in the multi-part storage list.

During the specific implementation, the client divides the image to be uploaded into multiple parts and transmits a multi-part upload request to the network server; the network server determines whether there is the image identifier of the image in the interruption list of the network server according to the multi-part upload request, interruption record condition of the upload-interrupted image is recorded in the interruption list, for example, the image identifier corresponding to the upload-interrupted image and information of the successfully-uploaded part are recorded. When the determination result is No, the client uploads successively the multiple parts to the network server; when the determination result is Yes, the client determines and uploads un-uploaded parts of the multiple parts to the network server according to a part corresponding to the image identifier in the interruption list; when there is also a multi-part storage list stored in the client and there is the image identifier of the image to be uploaded in the multi-part storage list, the client may determine and upload un-uploaded parts of the multiple parts to the network server according to a part corresponding to the image identifier in the multi-part storage list, so that after all the multiple parts of the image to be uploaded already exist, the network server combines the multiple parts into the image to be uploaded and stores the image. Therefore, the multi-part uploading method provided by the embodiment of the present disclosure can start to upload from a previously-interrupted position of a certain image, instead of re-uploading the whole image from beginning to end to the network server, thus avoiding a waste of network bandwidth resources of a user, improving upload rate and upload success rate, and further improving user experiences.

In step S104, after the image to be uploaded is uploaded successfully, the network server records the image identifier and returns an upload success response to the client.

After the step S104 is implemented, the method for uploading an image further includes step S105: the client stores correspondingly the image identifier into a synchronization list of the client according to the upload success response.

Specifically, after the network server recombines all the parts of the image to be uploaded to form a complete backup of the image, it means that the image to be uploaded is uploaded successfully, and at this point the network server records the image identifier of the successfully-uploaded image, and notifies the client that the image to be uploaded has already been successfully uploaded, and in the meantime the client stores information that the image is successfully uploaded, which is equivalent to having the synchronization list of the client updated, so as to be used in the preliminary screening of cloud synchronization.

In the embodiment of the present disclosure, the method for uploading an image further includes:

When the detection result of the network server is that there is the image identifier of the image in the interruption list of the network server, the client stops uploading the image to be uploaded; and The network server determines whether a user of a client of the image to be uploaded is the same as a user of a client of the image having the same image identifier, when a user of a client of the image to be uploaded is the same as a user of a client of the image having the same image identifier, exits; when a user of a client of the image to be uploaded is not the same as a user of a client of the image having the same image identifier, the image having the same image identifier is copied to a position corresponding to the user of the client of the image to be uploaded in the network server, and an upload success response is returned to the client.

During the specific implementation, when the network server determines that the ID of the image to be uploaded is the same as one of IDs of all images back-upped thereof or successfully-uploaded images, it means that there is a repeated ID, there is already a corresponding image backup in the network server, and when the detection result received by the client is that the ID of the image to be uploaded is the same as one of IDs of all images back-upped thereof or successfully-uploaded images, the uploading of the image is stopped; moreover, the network server further determines whether the image to be uploaded and the same image already existing in the network server are from a same user, when the image to be uploaded and the same image already existing in the network server are from a same user, the user of the client is notified that the image is successfully uploaded, and the user may also be reminded of information such as Don't Perform Repeated Uploading; if the image to be uploaded and the same image already existing in the network server are not from a same user, the network server rapidly copies the image with the same image identifier to a position where the user of the client stores images, and notifies the user of the client that the image is successfully uploaded. Since the embodiment of the present disclosure may implement image uploading through copying, and this is equivalent to Sync in a Blink, thus increasing greatly the upload rate, improving the effect of user experiences, and saving a great deal of bandwidth traffic for a user.

In the embodiment of the present disclosure, the network server is used to detect whether an image to be uploaded has already been uploaded, and when the detection result is that the image to be uploaded has already been uploaded, the client uploads the image in the form of multi-part uploading; the uploading status of the image is recorded at any time at the network server and the client, and when the image is successfully uploaded, the image identifier of the successfully-uploaded image is also recorded at the network server and/or the client; in this way, after an interruption occurs, part condition can be recorded, so that it is only desired to upload other un-uploaded parts from an interrupted position during a subsequent re-uploading process of the image, thus avoiding the traffic loss and the waste of resources resulted from repeated uploading, and implementing the anti-repetition detection function, improving upload rate and upload success rate, saving a great deal of network traffic bandwidths, and enhancing user experiences.

Embodiment 2

Figure 2:
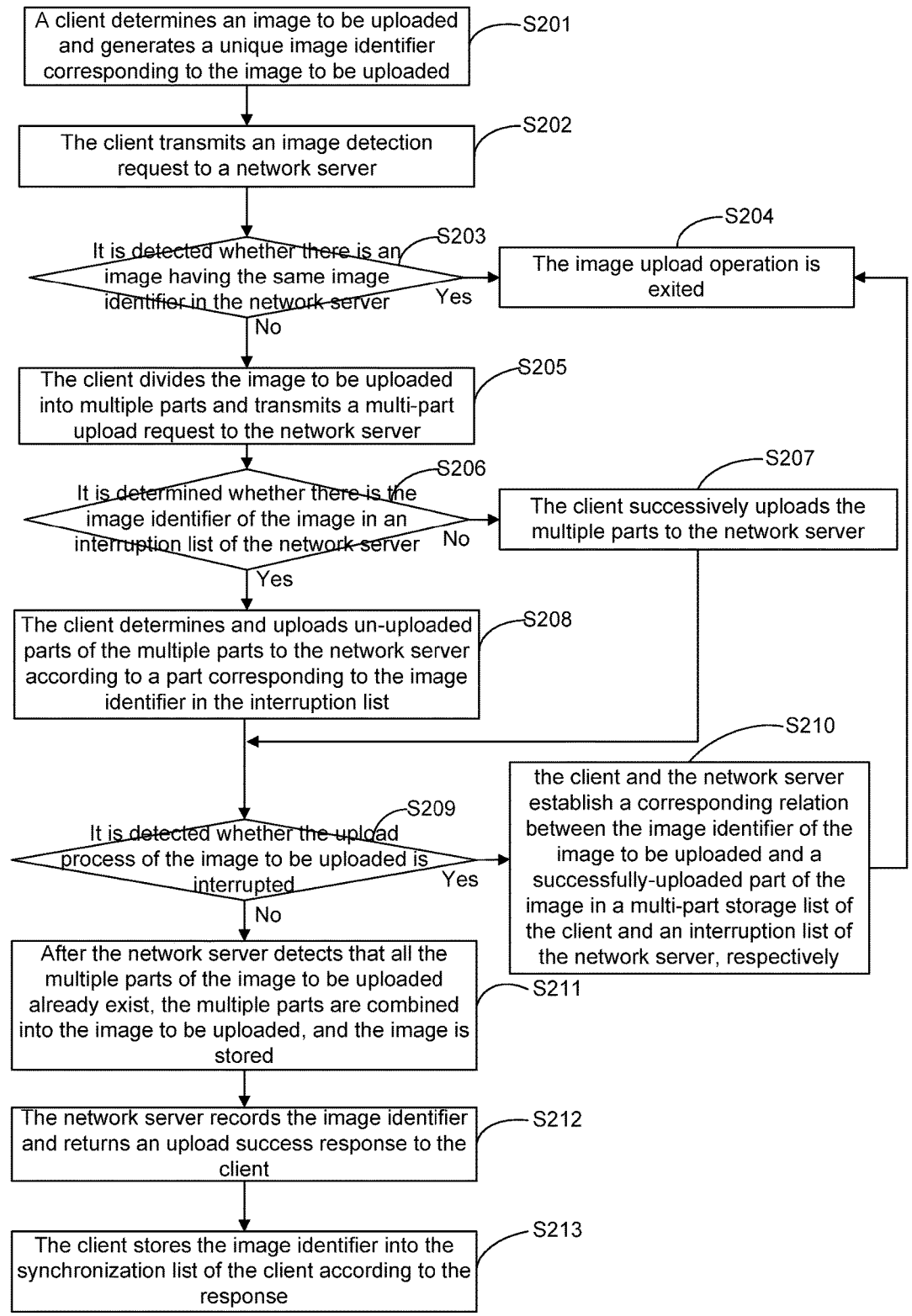
FIG. 2 illustrates a flow chart of a method for uploading an image according to a second embodiment of the present disclosure.

FIG. 2 shows an implementation flow of a method for uploading an image according to a second embodiment of the present disclosure, and the flow is elaborated as follows.

In step S201, a client determines an image to be uploaded and generates a unique image identifier corresponding to the image to be uploaded.

Wherein the image identifier refers to an ID used to uniquely identify the image and generated according to feature information of the image, such as the shape, colour and texture of an image.

In step S202, the client transmits an image detection request to a network server.

Specifically, generally after the step 201 is implemented and before the step 202 is implemented, the method for uploading an image further includes:

It is determined whether there is already an image identifier corresponding to the image to be uploaded in a synchronization list of the client, when there is already an image identifier corresponding to the image to be uploaded in a synchronization list of the client, the image upload operation is exited; when there is not an image identifier corresponding to the image to be uploaded in a synchronization list of the client, the image detection request is transmitted to the network server.

During the specific implementation, a user may operate a client terminal to manually upload an image, or the client terminal may automatically upload a new image when the new image is generated. Before the image is uploaded, the client generates a unique image identifier for identifying the image according to file attribute information, such as the content, establishment time and path of the image. For example, the unique image identifier for identifying the image may consist of the image path and the image name, or consist of feature information alone (such as the texture, colour and shape of the image), or consist of a digital identifier defined by the client, and there are no specific limits to the image identifier as long as it can uniquely identify the image.

The synchronization list of the client is established in advance for storing a successfully-uploaded image and the image identifier corresponding to the successfully-uploaded image; if an selected image has already been successfully uploaded to the network server, the successfully-uploaded image and its corresponding image identifier are stored in the synchronization list of the client, thus a preliminary screening is desired to be performed before the selected image is uploaded, so as to determine whether there is already an image identifier corresponding to the image in the synchronization list, when there is already an image identifier corresponding to the image in the synchronization list, it means that the image already exists in the network server, thus the operation for uploading the image is exited; when there is not an image identifier corresponding to the image in the synchronization list, it means that the image is not yet uploaded, and subsequent steps are implemented, thereby avoiding a waste of resources resulted from a repeated upload of an image, and reducing the workload for a user to upload images.

In addition, during the practical operation, it is possible that a user deletes a client software for cloud synchronization due to certain reason or that a crash occurs in the client software, which results in that buffer information of the technical solution is deleted, for example, a synchronization list or a multi-part storage list is deleted, and cases such as screening errors or inaccurate screening may occur if only the aforementioned preliminary screening is performed. Accordingly, in order to avoid those cases, in a preferable embodiment of the present disclosure, an image detection request needs subsequently to be transmitted to the network server, so as to perform a repetition detection operation.

In step S203, it is detected whether there is an image having the same image identifier in the network server, when there is an image having the same image identifier in the network server, step S204 is implemented and the image upload operation is exited; otherwise, step S205 is implemented.

Specifically, according to the image identifier included in the image detection request (the image identifier is namely ID information corresponding uniquely to the image to be uploaded), the network server determines whether the ID of the image to be uploaded is the same as one of IDs of all images back-upped thereof or successfully-uploaded images, when the ID of the image to be uploaded is the same as one of IDs of all images back-upped thereof or successfully-uploaded images, it means that there is a repeated ID, there is already a corresponding image backup in the network server, and the image upload operation is exited; when the ID of the image to be uploaded is not the same as one of IDs of all images back-upped thereof or successfully-uploaded images, step S205 is implemented. Further, after implementing step S204, the network server further determines whether a user of a client of the image to be uploaded is the same as a user of a client of the image having the same image identifier, when a user of a client of the image to be uploaded is the same as a user of a client of the image having the same image identifier, exits; when a user of a client of the image to be uploaded is not the same as a user of a client of the image having the same image identifier, the image having the same image identifier is copied to a position corresponding to the user of the client of the image to be uploaded in the network server, and this is equivalent to Sync in a Blink, thus increasing greatly the upload rate, improving the effect of user experiences, and saving a great deal of bandwidth traffic for a user; in the meantime, an upload success response may also be returned to the client.

In step S205, the client divides the image to be uploaded into multiple parts and transmits a multi-part upload request to the network server.

In step S206, it is determined whether there is the image identifier of the image in an interruption list of the network server, when there is the image identifier of the image in an interruption list of the network server, step S208 is implemented; when there is not the image identifier of the image in an interruption list of the network server, step S207 is implemented.

In step S207, the client successively uploads the multiple parts to the network server, and step S209 is proceeded to.

In step S208, the client determines and uploads un-uploaded parts of the multiple parts to the network server according to a part corresponding to the image identifier in the interruption list.

During the specific implementation, when the received detection result returned by the network server is that there is not an image having the same image identifier in the network server, it means that the image is not back-upped in the network server, then a multi-part uploading strategy is implemented on the image, i.e., an image is divided into multiple parts, each part is successively uploaded, and every time a part is successfully uploaded, the successfully-uploaded part is recorded respectively in the client and the network server; once all the parts of the image are successfully uploaded, the network server may recombine all the parts, thus a complete backup of the image is obtained.

During the practical operation, it is possible that some parts of the image to be uploaded are already successfully uploaded to the server, and since the network environment where the client is located is complicated, in the case of a 2G/3G network, a common upload rate is relatively slow, and due to the instability of the wireless network, the cloud synchronization process of the image may be interrupted at any time due to reasons such as a problem regarding a network connection, the exhaustion of a power supply of a mobile device, or a user-initiated interruption. Then it is desired that before uploading successively all the parts of the whole image to be uploaded, whether there is the image identifier of the image in the interruption list of the network server is determined, i.e., it is determined whether there is an interruption record, wherein interruption record condition of the upload-interrupted image is recorded in the interruption list, for example, the image identifier corresponding to the upload-interrupted image and information of the successfully-uploaded part are recorded. If there is not the interruption record, the client uploads successively the multiple parts to the network server; if there is the interruption record, the client determines and uploads un-uploaded parts of the multiple parts to the network server according to a part corresponding to the image identifier in the interruption list. In this way, the below problem is solved: due to these interruptions of the upload process, it is desired in each time that the client re-uploads the content of the image from beginning to end, the cloud synchronization process will be rather slow, and network traffic bandwidths of a user may also be wasted. Thus the image upload rate and upload success rate are improved, implementing the function which supports resuming from breakpoint.

In step S209, it is detected whether the upload process of the image to be uploaded is interrupted, when the upload process of the image to be uploaded is interrupted, step S210 is implemented; when the upload process of the image to be uploaded is not interrupted, step S211 is implemented.

In step S210, both the client and the network server establish a corresponding relation between the image identifier of the image to be uploaded and a successfully-uploaded part of the image respectively in a multi-part storage list of the client and an interruption list of the network server, then the step S204 is proceeded to and the current upload operation is exited.

Specifically, when it is detected that the upload process is interrupted, a corresponding relation between the image identifier of the image to be uploaded and a successfully-uploaded part of the image may be established in time both in a multi-part storage list of the client and an interruption list of the network server, wherein interruption record condition of the upload-interrupted image is recorded in the multi-part storage list, similarly, interruption record condition of the upload-interrupted image is recorded in the interruption list, for example, the image identifier corresponding to the upload-interrupted image and information of the successfully-uploaded part are recorded.

In step S211, after the network server detects that all the multiple parts of the image to be uploaded already exist, the multiple parts are combined into the image to be uploaded, and the image is stored.

In the embodiment of the present disclosure, the multi-part uploading strategy according to the embodiment of the present disclosure may also be dynamically adjusted based on a network environment, for example, a network environment detection module is arranged at a client to determine the type of a current network environment, and for a network environment where the rate is slow, the number of bytes occupying by each part may be adjusted to be small in advance, in this way, the success rate of uploading a part can be ensured to the most extent. While for a network environment where the rate is fast, such as a wireless WiFi, the number of bytes occupying by each part may be adjusted to be great, so as to reduce interaction times between a client and a network server. The number of bytes occupying by a part to be uploaded may not only be adjusted before multi-part uploading, but also be adjusted during the multi-part uploading according to information such as the type of the network environment at that time, thus enhancing the flexibility of the multi-part uploading.

In step S212, the network server records the image identifier and returns an upload success response to the client.

In step S213, the client stores correspondingly the image identifier into the synchronization list of the client according to the response.

During the specific implementation, after the network server recombines all the parts of the image to be uploaded to form a complete backup of the image, it means that the image to be uploaded is uploaded successfully, and at this point the network server records the image identifier of the successfully-uploaded image, and notifies the client that the image to be uploaded has already been successfully uploaded, and in the meantime the client stores locally in a terminal device where it is located information that the image is successfully uploaded, which is equivalent to having the synchronization list of the client updated, so that the preliminary screening of cloud synchronization of the client works.

In the embodiment of the present disclosure, the method for uploading an image implements functions of anti-repetition, Sync in a Blink and multi-part uploading as well as the function of resuming from breakpoint, and during the multi-part uploading, it is enabled to dynamically adjust the size of each un-uploaded part or of each part to be uploaded, so as to adapt to a network environment at that point. Compared to the prior art, the method for uploading an image according to the embodiment of the present disclosure has advantages such as fast upload rate, high upload success rate, network traffic bandwidths saving, high upload flexibility and effective user experience result.

It should be appreciated by those skilled in the art that all or part of the steps in the method according to the above embodiments may be implemented by related hardwares under instructions of a program, which is stored in a computer readable storage medium, such as ROM/RAM, magnetic disk, optical disk and the like. Therefore, another embodiment of the present disclosure provides a computer storage medium, in which a computer-executable instruction is stored, wherein the computer-executable instruction is configured to implement the method for uploading an image according to the embodiment of the present disclosure.

Embodiment 3

Figure 3:
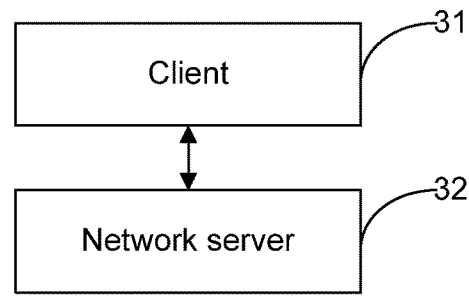
FIG. 3 illustrates a structure of a system for uploading an image according to a third embodiment of the present disclosure.

FIG. 3 shows a structure of a system for uploading an image according to a third embodiment of the present disclosure. For expositional convenience, only portions related to the embodiment of the present disclosure are shown.

The system for uploading an image includes a client 31 and a network server 32, wherein the client 31 is configured to: determine an image to be uploaded, generate a unique image identifier corresponding to the image to be uploaded, and transmit an image detection request to the network server.

Wherein the image identifier refers to an ID used to uniquely identify the image and generated according to feature information of the image, such as the shape, colour and texture of an image. And the client 31 further includes:

an identifier storage unit, configured to store correspondingly the image identifier into a synchronization list after an upload success response is received;

a first determination unit, configured to determine whether there is already an image identifier corresponding to the image to be uploaded in the synchronization list;

an exiting unit, configured to exit the image upload operation when an output of the first determination unit is that there is already an image identifier corresponding to the image to be uploaded in the synchronization list; and a request transmitting sub-unit, configured to transmit the image detection request to the network server 32 when an output of the first determination unit is that there is not an image identifier corresponding to the image to be uploaded in the synchronization list.

The synchronization list is established at the client in advance for storing a successfully-uploaded image and the image identifier corresponding to the successfully-uploaded image. In the embodiment of the present disclosure, for example, when the user enters a photo album at the client 31, a photo list will be displayed at the client 31, considering that there are many photos in the photo album, then the number of photos displayed in each page may be set, for example 50 photos are displayed per page; after the user determines an photo desired to be uploaded, the ID of the photo desired to be uploaded is calculated according to the content or feature information of the photo desired to be uploaded, a query synchronization or uploading information is transmitted to a background synchronization list, then it can be preliminarily determined by the first determination unit whether the client records information that the photo has already been uploaded, if it records, the photo will not be uploaded any more by using the exiting unit; otherwise, a detection request is transmitted to the network server 32 by the request transmitting sub-unit. Moreover, in the embodiment of the present disclosure, when the user turns the page, synchronization information of a photo may be displayed through asynchronous loading, and a prompt of the synchronization information can be displayed to the user so as to remind the user, for example, a default un-synchronized photo can be selected and a successfully-uploaded image cannot be selected any more. Thus, by determining firstly at the client 31 whether there are already successfully-uploaded images in images to be uploaded, the embodiment of the present disclosure can avoid a waste of resources resulted from a repeated upload of an image, and thus can reduce the workload for a user to upload images.

It should be noted that during a practical operation of uploading an image through the client, it is possible that a user deletes a client software for cloud synchronization due to certain reasons or that a crash occurs in the client software, which results in that buffer information of the technical solution is deleted, for example, a synchronization list or a multi-part storage list is deleted, then the client cannot accurately performs by the first determination unit, the preliminary screening on the image to be uploaded, and cases such as screening errors or inaccurate screening may occur if only the aforementioned preliminary screening is performed. Accordingly, in order to avoid those cases, in a preferable embodiment of the present disclosure, an image detection request needs subsequently to be transmitted to the network server 32.

The client 31 further includes:

an interruption detection unit, configured to detect whether the upload process of the image to be uploaded is interrupted; and a multi-part storage unit, configured to: when an output of the interruption detection unit is that the upload process of the image to be uploaded is interrupted, establish a corresponding relation between the image identifier of the image to be uploaded and a successfully-uploaded part of the image in a multi-part storage list.

In addition, the client 31 further includes a multi-part size adjustment unit configured to dynamically adjust the size of each part of the image to be uploaded according to a network environment.

In the embodiment of the present disclosure, the multi-part uploading strategy according to the embodiment of the present disclosure may also be dynamically adjusted based on a network environment, for example, a network environment detection module is arranged at the client 31 to determine the type of a current network environment or the network transmission rate, and for a network environment where the rate is slow, the number of bytes occupying by each part may be adjusted to be small, in this way, the success rate of uploading a part can be ensured to the most extent. While for a network environment where the rate is fast, such as a wireless WiFi, the number of bytes occupying by each part may be adjusted to be great, so as to reduce interaction times between the client 31 and the network server 32. The number of bytes occupying by a part to be uploaded may not only be adjusted before multi-part uploading, but also be adjusted during the multi-part uploading according to information such as the type of the network environment at that time, thus enhancing the flexibility of the multi-part uploading.

The network server 32 is configured to: detect whether there is an image having the same image identifier in the network server 32 according to the image identifier included in the image detection request, return a detection result to the client 31, record the image identifier after the image to be uploaded is uploaded successfully, and return an upload success response to the client 31.

The client 31 is further configured to: when the received detection result returned by the network server 32 is there is not an image identifier corresponding to the image to be uploaded in the synchronization list, upload the image to be uploaded in the form of multi-part uploading to the network server 32.

In the embodiment of the present disclosure, the network server 32 receives the image detection request transmitted from the client 31, and according to the image identifier included in the image detection request (the image identifier is namely ID information corresponding uniquely to the image to be uploaded), the network server 32 determines whether the ID of the image to be uploaded is the same as one of IDs of all images back-upped thereof or successfully-uploaded images, when the ID of the image to be uploaded is the same as one of IDs of all images back-upped thereof or successfully-uploaded images, it means that there is a repeated ID, there is already a corresponding image backup in the network server 32, and it is not necessary to upload the image to be uploaded once again; when the ID of the image to be uploaded is not the same as one of IDs of all images back-upped thereof or successfully-uploaded images, it means that there is not a repeated ID, and the network server 32 returns the detection result to the client 31. And after detecting that all the parts of the image to be uploaded are already successfully uploaded, the network server 32 stores the image, records the image identifier, and then returns a upload success response to the client 31.

The network server 32 further includes:

an interruption detection unit, configured to detect whether the upload process of the image to be uploaded is interrupted; and an interrupted multi-part storage unit, configured to: when an output of the interruption detection unit is that the upload process of the image to be uploaded is interrupted, establish in a preset interruption list a corresponding relation between the image identifier of the image to be uploaded and a successfully-uploaded part of the image.

In the embodiment of the present disclosure, the network server 32 detects that the image to be uploaded by the user is unique, and the client 31 is desired to upload the image to the network server 32. However, since the network environment where the client 31 is located is complicated, in the case of a 2G/3G network, a common upload rate is relatively slow, and due to the instability of the wireless network, the cloud synchronization process of the image may be interrupted at any time due to reasons such as a problem regarding a network connection, the exhaustion of a power supply of a mobile device, or a user-initiated interruption. If due to these interruptions of the upload process, it is desired in each time that the client 31 re-uploads the content of the image from beginning to end to the network server 32, the cloud synchronization process will be rather slow, and network traffic bandwidths of a user may also be wasted. Therefore, the embodiment of the present disclosure proposes to upload the image to be uploaded in the form of multi-part uploading, i.e., the image is divided into several parts, and the combination of content of all the parts is equal to the whole content of the original image; when it is detected that the upload process is interrupted, a corresponding relation between the image identifier of the image to be uploaded and a successfully-uploaded part of the image may be established in time both in a preset multi-part storage list of the client 31 and a preset interruption list of the network server 32, wherein interruption record condition of the upload-interrupted image is recorded in the multi-part storage list, for example, the image identifier corresponding to the upload-interrupted image and information of the successfully-uploaded part are recorded; similarly, interruption record condition of the upload-interrupted image is recorded in the interruption list, for example, the image identifier corresponding to the upload-interrupted image and information of the successfully-uploaded part are recorded.

In the embodiment of the present disclosure, when the detection result returned by the network server 32 and then received by the client 31 is that there is not an image identifier corresponding to the image to be uploaded in the synchronization list, it means that the image is not backupped in the network server 32, then a multi-part uploading strategy is implemented on the image, i.e., an image is divided into multiple parts, each part is successively uploaded, and every time a part is successfully uploaded, the successfully-uploaded part is recorded respectively in the client 31 and the network server 32; once all the parts of the image are successfully uploaded, the network server 32 may recombine all the parts, thus a complete backup of the image is obtained. If it is detected before the multi-part uploading that the image to be uploaded has already been uploaded, according to the record condition of the parts of the image in the multi-part storage list of the client 31 and/or the record condition of the parts of the image in the interruption list of the network server 32, an interrupted position corresponding to the image or other un-uploaded parts are acquired, thus the uploading is continued from the interrupted position of the image until all the parts of the image are successfully uploaded; then the network server 32 recombines all the parts of the image to be uploaded to form a complete backup of the image, at this point, the network server records the image identifier of the successfully-uploaded image, and notifies the client 31 that the image to be uploaded has already been successfully uploaded, and in the meantime the client 31 stores locally this information, which is equivalent to having the synchronization list of the client 31 updated.

In the embodiment of the present disclosure, the system for uploading an image may further determines by the network server 32 whether a user corresponding to the image to be uploaded is the same as a user corresponding to an image (it is the same as the image to be uploaded) in the network server 32, if the users are the same, a prompt, such as that the image to be uploaded has already been uploaded, may be returned to the client 31; if the users are not the same, the image in the network server 32 is copied to a storage position of the user corresponding to the image to be uploaded, so as to implement Sync in a Blink, and a prompt, such as that the image to be uploaded has already been uploaded, may also be returned to the client 31, thus eventually improving the image upload rate and also avoiding a waste of resources.

The system for uploading an image according to the embodiment of the present disclosure includes the client 31 and the network server 32, implements functions which support resuming from breakpoint and repetition detection for a same image, and achieves the objective of enhancing user experiences.

Embodiment 4

Figure 4:
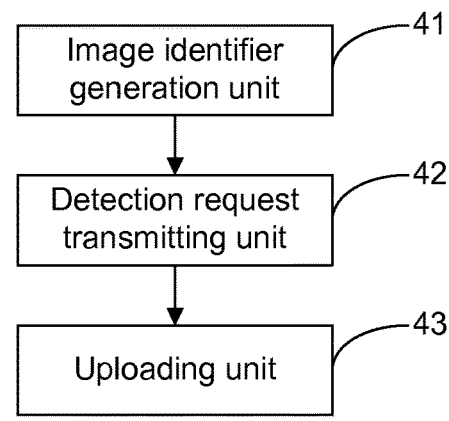
FIG. 4 illustrates a structure of a client for uploading an image according to a fourth embodiment of the present disclosure.

FIG. 4 shows the structure of a client for uploading an image according to a fourth embodiment of the present disclosure. For expositional convenience, only portions related to the embodiment of the present disclosure are shown.

The client for uploading an image includes an image identifier generation unit 41, a detection request transmitting unit 42 and an uploading unit 43, wherein the image identifier generation unit 41 is configured to determine an image to be uploaded and generate a unique image identifier corresponding to the image to be uploaded.

Wherein the image identifier refers to an ID used to uniquely identify the image and generated according to feature information of the image, such as the shape, colour and texture of an image.

In addition, the client for uploading an image further includes:

an identifier storage unit, configured to store correspondingly the image identifier into a synchronization list after an upload success response is received;

a first determination unit, configured to determine whether there is already an image identifier corresponding to the image to be uploaded in the synchronization list;

an exiting unit, configured to exit the image upload operation when an output of the first determination unit is that there is already an image identifier corresponding to the image to be uploaded in the synchronization list; and a request transmitting sub-unit, configured to transmit the image detection request to a network server when an output of the first determination unit is that there is not an image identifier corresponding to the image to be uploaded in the synchronization list.

Wherein the identifier storage unit, the first determination unit, the exiting unit and the request transmitting sub-unit provided by the embodiment of the present disclosure are totally the same as the identifier storage unit, the first determination unit, the exiting unit and the request transmitting sub-unit respectively in the third embodiment of the present disclosure, and the detailed description thereof will be omitted.

The detection request transmitting unit 42 is configured to transmit an image detection request to a network server so that the network server detects whether there is an image having the same image identifier in the network server according to the image identifier included in the image detection request.

In the embodiment of the present disclosure, a user may operate a client terminal to manually upload an image, or the client terminal may automatically upload a new image when the new image is generated. After the user selects an image desired to be uploaded by the image identifier generation unit 41, the client generates a unique image identifier for identifying the image according to file attribute information, such as the content, establishment time and path of the image. In order to accurately avoid a waste of resources resulted from a repeated upload of an image and reduce the workload for a user to upload images, it is desired to transmit an image detection request to the network server by the detection request transmitting unit 42.

The uploading unit 43 is configured to: when the received detection result returned by the network server is that there is not an image identifier corresponding to the image to be uploaded in the synchronization list, upload the image to be uploaded in the form of multi-part uploading to the network server.

When the uploading unit 43 is triggered, the client for uploading an image further includes:

an interruption detection unit, configured to detect whether the upload process of the image to be uploaded is interrupted; and a multi-part storage unit, configured to: when an output of the interruption detection unit is that the upload process of the image to be uploaded is interrupted, establish a corresponding relation between the image identifier of the image to be uploaded and a successfully-uploaded part of the image in a multi-part storage list.

The interruption detection unit and the multi-part storage unit provided by the embodiment of the present disclosure are totally the same as the interruption detection unit and the multi-part storage unit respectively in the third embodiment of the present disclosure, and the detailed description thereof will be omitted.

Wherein the uploading unit 43 specifically includes the following units:

an upload request allocation unit, configured to divide the image to be uploaded into multiple parts and transmit a multi-part upload request to the network server;

a first multi-part uploading unit, configured to upload successively the multiple parts to the network server when the received determination result returned by the network server is that there is not an image identifier corresponding to the image to be uploaded in the synchronization list; and a second multi-part uploading unit, configured to determine and upload un-uploaded parts of the multiple parts to the network server according to a part corresponding to the image identifier in the interruption list when the received determination result returned by the network server is that there is an image identifier corresponding to the image to be uploaded in the synchronization list.

In the embodiment of the present disclosure, the network server receives the image detection request transmitted from the client, and according to the image identifier included in the image detection request (the image identifier is namely ID information corresponding uniquely to the image to be uploaded), the network server determines whether the ID of the image to be uploaded is the same as one of IDs of all images back-upped thereof or successfully-uploaded images, and returns a detection result to the client. When the received detection result returned by the network server is that there is not an image identifier corresponding to the image to be uploaded in the synchronization list, it means that the image is not back-upped in the network server, then a multi-part uploading strategy is implemented on the image by the uploading unit 43 of the client, i.e., an image may be divided into multiple parts, each part is successively uploaded, and every time a part is successfully uploaded, the successfully-uploaded part is recorded respectively in the client and the network server; once all the parts of the image are successfully uploaded, the network server may recombine all the parts, thus a complete backup of the image is obtained.

In the embodiment of the present disclosure, after the network server recombines all the parts of the image to be uploaded to form a complete backup of the image, it means that the image to be uploaded is uploaded successfully, and at this point the network server records the image identifier of the successfully-uploaded image, and notifies the client that the image to be uploaded has already been successfully uploaded, and in the meantime the client stores locally in a terminal device where it is located information that the image is successfully uploaded, which is equivalent to having the synchronization list of the client updated, so that the preliminary screening of cloud synchronization of the client works.

In addition, the client for uploading an image further includes a multi-part size adjustment unit configured to dynamically adjust the size of each part of the image to be uploaded according to a network environment. Since the multi-part size adjustment unit is totally the same as the multi-part size adjustment unit described in the third embodiment of the present disclosure, the detailed description thereof will be omitted.

The client for uploading an image according to embodiment of the present disclosure, through its communication with a network server, can avoid a waste of resources resulted from repeated uploading of a same image when different users or the current user upload(s) the same image already stored in the network server, and if an interruption occurs during uploading of an image due to environmental reasons, it is only desired to continue the uploading from the interrupted position instead of re-uploading the whole image when the image is re-uploaded subsequently. In other words, the multi-part uploading strategy and the method of resuming from breakpoint are used, thus improving greatly the upload rate and the upload success rate, and providing a user with excellent experiences.

Embodiment 5

Figure 5:
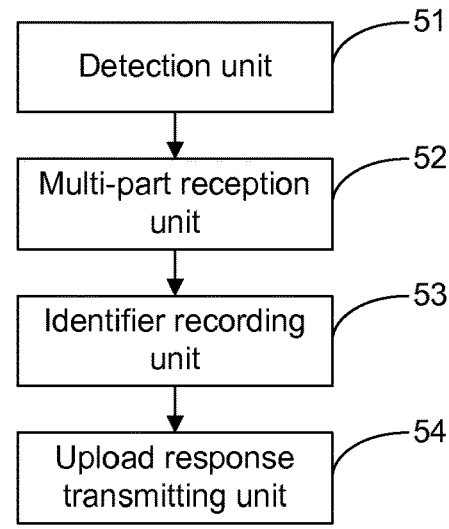
FIG. 5 illustrates a structure of a network server according to a fifth embodiment of the present disclosure.

FIG. 5 shows the structure of a network server according to a fifth embodiment of the present disclosure. For expositional convenience, only portions related to the embodiment of the present disclosure are shown.

The network server includes a detection unit 51, a multi-part reception unit 52, an identifier recording unit 53 and an upload response transmitting unit 54, wherein The detection unit 51 is configured to: detect whether there is an image having a same image identifier in the network server according to an image identifier included in an image detection request transmitted by a client, and return a detection result to the client.

In the embodiment of the present disclosure, the network server receives the image detection request transmitted from the client, and according to the image identifier included in the image detection request (the image identifier is namely ID information corresponding uniquely to the image to be uploaded), the detection unit 51 determines whether the ID of the image to be uploaded is the same as one of IDs of all images back-upped thereof or successfully-uploaded images, when the ID of the image to be uploaded is the same as one of IDs of all images back-upped thereof or successfully-uploaded images, it means that there is a repeated ID, there is already a corresponding image backup in the network server, and it is not necessary to upload the image to be uploaded once again; when the ID of the image to be uploaded is not the same as one of IDs of all images back-upped thereof or successfully-uploaded images, it means that there is not a repeated ID, and the network server returns the detection result to the client.

The multi-part reception unit 52 is configured to receive an image to be uploaded transmitted by the client and uploaded in the form of multi-part uploading.

The identifier recording unit 53 is configured to: after the image to be uploaded is uploaded successfully, record the image identifier.

The upload response transmitting unit 54 is configured to return an image upload success response to the client.

In the embodiment of the present disclosure, when a multi-part uploading strategy is implemented on the image to be uploaded, i.e., an image is divided into multiple parts, each part is successively uploaded, and every time a part is successfully uploaded, the successfully-uploaded part is recorded respectively in the network server; once all the parts of the image are successfully uploaded, the network server may recombine all the parts, thus a complete backup of the image is obtained, at this point, the identifier recording unit 53 records the image identifier, and the upload response transmitting unit 54 returns an image upload success response to the client.

In addition, the network server further includes:

an interruption detection unit, configured to detect whether the upload process of the image to be uploaded is interrupted; and an interrupted multi-part storage unit, configured to: when an output of the interruption detection unit is that the upload process of the image to be uploaded is interrupted, establish in a preset interruption list a corresponding relation between the image identifier of the image to be uploaded and a successfully-uploaded part of the image.

In the embodiment of the present disclosure, since the network environment where the client is located is complicated, in the case of a 2G/3G network, a common upload rate is relatively slow, and due to the instability of the wireless network, the cloud synchronization process of the image may be interrupted at any time due to reasons such as a problem regarding a network connection, the exhaustion of a power supply of a mobile device, or a user-initiated interruption. If due to these interruptions of the upload process, it is desired in each time that the client re-uploads the content of the image from beginning to end to the network server, the cloud synchronization process will be rather slow, and network traffic bandwidths of a user may also be wasted. Then, the interruption detection unit can detect in real time whether the uploading process of the image to be uploaded is interrupted, and when an output of the interruption detection unit is that the upload process of the image to be uploaded is interrupted, the interrupted multi-part storage unit can establish in a preset multi-part storage list a corresponding relation between the image identifier of the image to be uploaded and a successfully-uploaded part of the image.

The network server further includes:

a multi-part upload request reception unit, configured to receive a multi-part upload request transmitted by the client;

an interruption identifier determination unit, configured to determine whether there is the image identifier of an image in the interruption list and return a determination result to the client; and a multi-part combination unit, configured to combine the multiple parts into the image to be uploaded and store the image when it is detected that all the multiple parts of the image to be uploaded already exist.

In the embodiment of the present disclosure, according to the multi-part upload request, the network server determines by the interruption identifier determination unit whether there is the image identifier of the image to be uploaded in its interruption list, and returns a determination result to the client, so that the client implements a corresponding operation, for example, when the determination result received by the client is that there is an image identifier corresponding to the image to be uploaded in the synchronization list, up-uploaded parts of the multiple parts are determined and then uploaded to the network server according to a part corresponding to the image identifier in the interruption list; if a multi-part storage list is also stored at the client, and there is the image identifier of the image to be uploaded in the multi-part storage list, the client can determine and upload up-uploaded parts of the multiple parts to the network server according to according to a part corresponding to the image identifier in the interruption list; further, when all the multiple parts already exist, the multi-part combination unit combines the multiple parts into the image to be uploaded and stores the image. Therefore, the multi-part uploading method provided by the embodiment of the present disclosure can start to upload from a previously-interrupted position of a certain image, instead of re-uploading the whole image from beginning to end to the network server, thus avoiding a waste of network bandwidth resources of a user, improving upload rate and upload success rate, and further improving user experiences.

In the embodiment of the present disclosure, when the detection result returned by the detection unit is that there is already an image identifier corresponding to the image to be uploaded in the synchronization list, the client stops uploading the image, at this point, the network server provided by the present disclosure further includes:

a user determination unit, configured to judge whether a user of a client of the image to be uploaded is the same as a user of a client of the image having the same image identifier;

an exiting unit, configured to exit when an output of the user determination unit is that there is already an image identifier corresponding to the image to be uploaded in the synchronization list; and a copying unit, configured to copy the image having the same image identifier to a position corresponding to the user of the client of the image to be uploaded in the network server when the output of the user determination unit is that there is not an image identifier corresponding to the image to be uploaded in the synchronization list.

In the embodiment of the present disclosure, an image backup corresponding to the image to be uploaded has already been stored in the network server, and the detection result received by the client is that there is already an image identifier corresponding to the image to be uploaded in the synchronization list, then uploading of the image is stopped, and it is further determined whether the image to be uploaded and the same image already existing in the network server are from a same user, when the image to be uploaded and the same image already existing in the network server are from a same user, the user of the client is notified that the image is successfully uploaded, and the user may also be reminded of information such as Don't Perform Repeated Uploading; the image to be uploaded and the same image already existing in the network server are not from a same user, the network server rapidly copies the image with the same image identifier to a position where the user of the client stores images, and notifies the user of the client that the image is successfully uploaded.

The embodiment of the present disclosure can perform a repetition detection on an image to be uploaded to avoid an undesired repeated upload, and interruption condition when an image is uploaded in the form of multi-part uploading may also be recorded so that it is only desired to upload from an interrupted position when an interrupted image is uploaded subsequently, and this is equivalent to Sync in the Blink of an image, compared to the prior art, the upload rate is greatly improved, user experiences are improved, and a great deal of bandwidth traffic is saved for a user.

In embodiments of the present disclosure, a client transmits an image upload detection request to a network server, the network server detects whether an image to be uploaded has already been uploaded, and when the detection result is an image to be uploaded has not been uploaded, the client uploads the image in the form of multi-part uploading; the upload status of the image is recorded at any time at the network server and the client, and after the image is successfully uploaded, the identifier of the successfully-uploaded image is also recorded at the network server and/or the client. In this way, the problem of repeated uploading of a same image in the prior art is solved, thus improving upload rate, saving a great deal of network traffic bandwidths, and enhancing user experiences; and when an interruption occurs, the multi-part uploading condition can be recorded, so that it is only desired to upload from the interrupted position other un-uploaded parts during subsequent re-uploading of the image, thus avoiding the traffic loss and the waste of resources resulted from a repeated upload Preferable embodiments of the present disclosure are described, and are not intended to limit the present disclosure. All modifications, replacements and improvements made within the spirit and principles of the present disclosure should be included within the scope of protection of the present disclosure.

The invention claimed is:

1. A method for uploading an image from a client to a network server connecting to the client through a network, wherein the method is performed by the client having one or more processors, the method comprising:

determining an image to be uploaded from the client to the network server;

generating a unique image identifier corresponding to the image to be uploaded according to feature information of the image, the feature information including one or more of: a shape, a color, and a texture of the image;

determining whether there is an image identifier corresponding to the image to be uploaded in a synchronization list of the client, wherein the synchronization list stores image identifiers corresponding to images that have been uploaded to the network server successfully;

in accordance with a determination that there is not an image identifier corresponding to the image to be uploaded in the synchronization list of the client, transmitting an image detection request to the network server, the image detection request including the image identifier;

receiving a detection result from the network server indicating whether there is an image in the network server having the same image identifier as the image identifier included in the image detection request;

responsive to the detection result that there is not an image having the same image identifier in the network server, uploading the image to be uploaded in the form of multi-part uploading to the network server, further comprising:

detecting in real time a network transmission rate of current network environment;

determining a number of bytes occupied by each part of the image to be uploaded according to the network transmission rate of current network environment;

dividing the image to be uploaded into multiple parts, each part having a size no greater than the determined number of bytes; and uploading each of the multiple parts of the image to the network server separately; and after the image is uploaded successfully:

receiving an upload success response from the network server; and storing the image identifier into the synchronization list of the client according to the upload success response is received.

2. The method according to claim 1, further comprising:

in accordance with a determination that there is an image identifier corresponding to the image to be uploaded in the synchronization list of the client, exiting the image upload operation.

3. The method according to claim 1, wherein the uploading the image to be uploaded in the form of multi-part uploading to the network server further comprises:

in response to a detection that the uploading process of the image to be uploaded is interrupted, establishing a corresponding relation between the image identifier of the image to be uploaded and a successfully-uploaded part of the image in a multi-part storage list of the client, wherein the multi-part storage list records interruption conditions of the image whose upload is interrupted.

4. The method according to claim 3, wherein uploading the image to be uploaded in the form of multi-part uploading to the network server further comprises:

dividing the image to be uploaded into multiple parts;
transmitting a multi-part upload request to the network server;
receiving, from the network server, a determination result whether there is the image identifier of the image in the network server according to the multi-part upload request;
in response to the determination result that there is not the image identifier of the image in the network server, uploading successively the multiple parts to the network server; and
in response to the determination result that there is the image identifier of the image in the network server, determining and uploading un-uploaded parts of the multiple parts to the network server according to a part corresponding to the image identifier in an interruption list of the network server, wherein the interruption list records interruption conditions of the image corresponding to the image identifier.

5. A client for uploading an image from the client to a network server connecting to the client through a network, comprising:

memory storing computer-executable instructions; and
one or more processors executing the computer-executable instructions to perform a method comprising:
determining an image to be uploaded from the client to the network server;
generating a unique image identifier corresponding to the image to be uploaded according to feature information of the image, the feature information including one or more of: a shape, a color, and a texture of the image;
determining whether there is an image identifier corresponding to the image to be uploaded in a synchronization list, wherein the synchronization list stores image identifiers corresponding to images that have been uploaded to the network server successfully;
in accordance with a determination that there is not an image identifier corresponding to the image to be uploaded in the synchronization list of the client, transmitting an image detection request to the network server, the image detection request including the image identifier;
receiving a detection result from the network server indicating whether there is an image in the network server having the same image identifier as the image identifier included in the image detection request;
responsive to the detection result that there is not an image having the same image identifier in the network server, uploading the image to be uploaded in the form of multi-part uploading to the network server, further comprising:
detecting in real time a network transmission rate of current network environment;
determining a number of bytes occupied by each part of the image to be uploaded according to the network transmission rate of current network environment;
dividing the image to be uploaded into multiple parts, each part having a size no greater than the determined number of bytes; and
uploading each of the multiple parts of the image to the network server separately;
after the image is uploaded successfully:
receiving an upload success response from the network server; and
storing the image identifier into the synchronization list of the client after the upload success response is received.

6. The client according to claim 5, the computer-executable instructions to perform the method further comprise:

in accordance with a determination that there is an image identifier corresponding to the image to be uploaded in the synchronization list of the client, exiting the image upload operation.

7. A non-transitory computer-readable storage medium with computer-executable instructions stored thereon, at a client for uploading an image from the client to a network server connecting to the client through a network, the computer-executable instructions are executable for:

determining an image to be uploaded from the client to the network server;
generating a unique image identifier corresponding to the image to be uploaded according to feature information of the image, the feature information including one or more of: a shape, a color, and a texture of the image;
determining whether there is an image identifier corresponding to the image to be uploaded in a synchronization list of the client, wherein the synchronization list stores image identifiers corresponding to images that have been uploaded to the network server successfully;
in accordance with a determination that there is not an image identifier corresponding to the image to be uploaded in the synchronization list of the client, transmitting an image detection request to the network server, the image detection request including the image identifier;
receiving a detection result from the network server indicating whether there is an image in the network server having the same image identifier as the image identifier included in the image detection request;
responsive to the detection result that there is not an image having the same image identifier in the network server, uploading the image to be uploaded in the form of multi-part uploading to the network server, further comprising:
detecting in real time a network transmission rate of current network environment;
determining a number of bytes occupied by each part of the image to be uploaded according to the network transmission rate of current network environment;
dividing the image to be uploaded into multiple parts, each part having a size no greater than the determined number of bytes; and
uploading each of the multiple parts of the image to the network server separately; and
after the image to be uploaded is uploaded successfully:
receiving an upload success response from the network server; and
storing the image identifier into the synchronization list of the client according to the upload success response is received.

8. The non-transitory computer-readable storage medium according to claim 7, the computer-executable instructions are executable for:
in accordance with a determination that there is an image identifier corresponding to the image to be uploaded in the synchronization list of the client, exiting the image upload operation.

9. The non-transitory computer-readable storage medium according to claim 7, wherein the computer-executable instructions are executable for:
in response to a detection by the client that the uploading process of the image to be uploaded is interrupted, establishing a corresponding relation between the image identifier of the image to be uploaded and a successfully-uploaded part of the image in a multi-part storage list of the client, wherein the multi-part storage list records interruption conditions of the image whose upload is interrupted.

10. The non-transitory computer-readable storage medium according to claim 9, wherein the computer-executable instructions are executable for:
dividing the image to be uploaded into multiple parts, and transmitting a multi-part upload request to the network server;
receiving, from the network server, a determination result whether there is the image identifier of the image in the network server according to the multi-part upload request;
in response to the determination result that there is not the image identifier of the image in the network server, uploading successively the multiple parts to the network server; and
in response to the determination result that there is the image identifier of the image in the network server, determining and uploading un-uploaded parts of the multiple parts to the network server according to a part corresponding to the image identifier in an interruption list of the network server, wherein the interruption list records interruption conditions of the image corresponding to the image identifier.

* * * * *